(12) United States Patent
Song

(10) Patent No.: US 8,948,381 B2
(45) Date of Patent: Feb. 3, 2015

(54) CONDITIONAL KEY GENERATION BASED ON EXPIRATION DATE OF DATA

(75) Inventor: Zhexuan Song, Sunnyvale, CA (US)

(73) Assignee: Fujitsu Limited, Kawasaki-shi (JP)

( * ) Notice: Subject to any disclaimer, the term of this patent is extended or adjusted under 35 U.S.C. 154(b) by 110 days.

(21) Appl. No.: 13/228,786

(22) Filed: Sep. 9, 2011

(65) Prior Publication Data

US 2013/0064365 A1    Mar. 14, 2013

(51) Int. Cl.
*H04L 29/06* (2006.01)
*H04L 9/08* (2006.01)

(52) U.S. Cl.
CPC ..................................... *H04L 9/088* (2013.01)
USPC ............... 380/44; 380/30; 380/277; 380/278; 380/286; 713/150; 713/170; 713/171; 713/189; 726/27

(58) Field of Classification Search
CPC ....................................................... H04L 9/088
USPC .............. 380/30, 44, 277, 286, 278; 713/150, 713/171, 170, 189; 726/27
See application file for complete search history.

(56) References Cited

U.S. PATENT DOCUMENTS

| | | | |
|---|---|---|---|
| 7,617,251 B2* | 11/2009 | Blumenau et al. ..................... 1/1 |
| 7,680,801 B2* | 3/2010 | Blumenau et al. ............ 707/707 |
| 7,757,270 B2* | 7/2010 | Blumenau ........................ 726/1 |
| 7,809,699 B2* | 10/2010 | Passmore et al. ............. 707/694 |
| 7,814,062 B2* | 10/2010 | Blumenau et al. ............ 707/663 |
| 7,849,328 B2* | 12/2010 | Blumenau ..................... 713/189 |
| 7,958,087 B2* | 6/2011 | Blumenau ..................... 707/610 |
| 8,037,036 B2* | 10/2011 | Blumenau et al. ............ 707/694 |
| 2003/0081785 A1* | 5/2003 | Boneh et al. ................... 380/277 |
| 2006/0106812 A1* | 5/2006 | Blumenau et al. .............. 707/10 |
| 2006/0106883 A1* | 5/2006 | Blumenau et al. ............ 707/200 |
| 2006/0143443 A1* | 6/2006 | Cohen et al. ................... 713/158 |
| 2008/0091613 A1* | 4/2008 | Gates et al. ...................... 705/59 |
| 2010/0017593 A1* | 1/2010 | Putz .............................. 713/150 |
| 2010/0185861 A1* | 7/2010 | Chase et al. ................... 713/171 |
| 2010/0208895 A1* | 8/2010 | Boneh et al. ................... 380/278 |
| 2010/0208898 A1* | 8/2010 | Acar et al. ..................... 380/280 |
| 2010/0266132 A1* | 10/2010 | Bablani et al. ................. 380/286 |
| 2010/0293099 A1* | 11/2010 | Pauker et al. ................... 705/67 |
| 2011/0145580 A1* | 6/2011 | Auradkar et al. ............. 713/170 |
| 2011/0145593 A1* | 6/2011 | Auradkar et al. ............. 713/189 |
| 2011/0206200 A1* | 8/2011 | Sovio et al. ..................... 380/30 |
| 2011/0246518 A1* | 10/2011 | Mehrotra et al. ............. 707/770 |
| 2012/0150925 A1* | 6/2012 | Gupta et al. ................... 707/822 |
| 2012/0166792 A1* | 6/2012 | Tan ................................ 713/150 |

(Continued)

OTHER PUBLICATIONS

Bao Zhang et al. Identity-based distributed cloud storage encryption scheme. Jun. 15, 2011. p. 1-5.*
Liqun Chen. Identity-based cryptography. 2006. p. 1-55.*

(Continued)

*Primary Examiner* — Luu Pham
*Assistant Examiner* — Kari Schmidt
(74) *Attorney, Agent, or Firm* — Baker Botts L.L.P.

(57) ABSTRACT

In one embodiment, receive a first request in connection with accessing a set of encrypted data, wherein the set of encrypted data has an expiration date; the first request comprises a first key associated with the expiration date; and the set of encrypted data has been encrypted using the first key. Validate the first key by comparing the expiration date against a current time. Generate a second key for decrypting the set of encrypted data using the first key only if the expiration date has not passed.

22 Claims, 2 Drawing Sheets

(56) References Cited

U.S. PATENT DOCUMENTS

2012/0258777 A1* 10/2012 Huang .................. 455/557
2012/0300936 A1* 11/2012 Green .................. 380/278

OTHER PUBLICATIONS

Chang, Fay, et al. "Bigtable: A distributed storage system for structured data." ACM Transactions on Computer Systems (TOCS) 26.2 (2008): 4.*

Tchao, A et al. "SmartContent: A self-protecting and context-aware active content." Self-Adaptive and Self-Organizing Systems Workshops (SASOW), 2012 IEEE Sixth International Conference on. IEEE, 2012.*

Yao, Danfeng et al., "ID-Based Encryption for Complex Hierarchies with Applications to Forward Security and Broadcast Encryption," *CCS '04 Proceedings of the 11th ACM conference on Computer and communications security*, 2004.

Sahai, Amit et al, "Fuzzy Identity-Based Encryption," *Lecture Notes in Computer Science*, vol. 3494/2005, 2005.

* cited by examiner

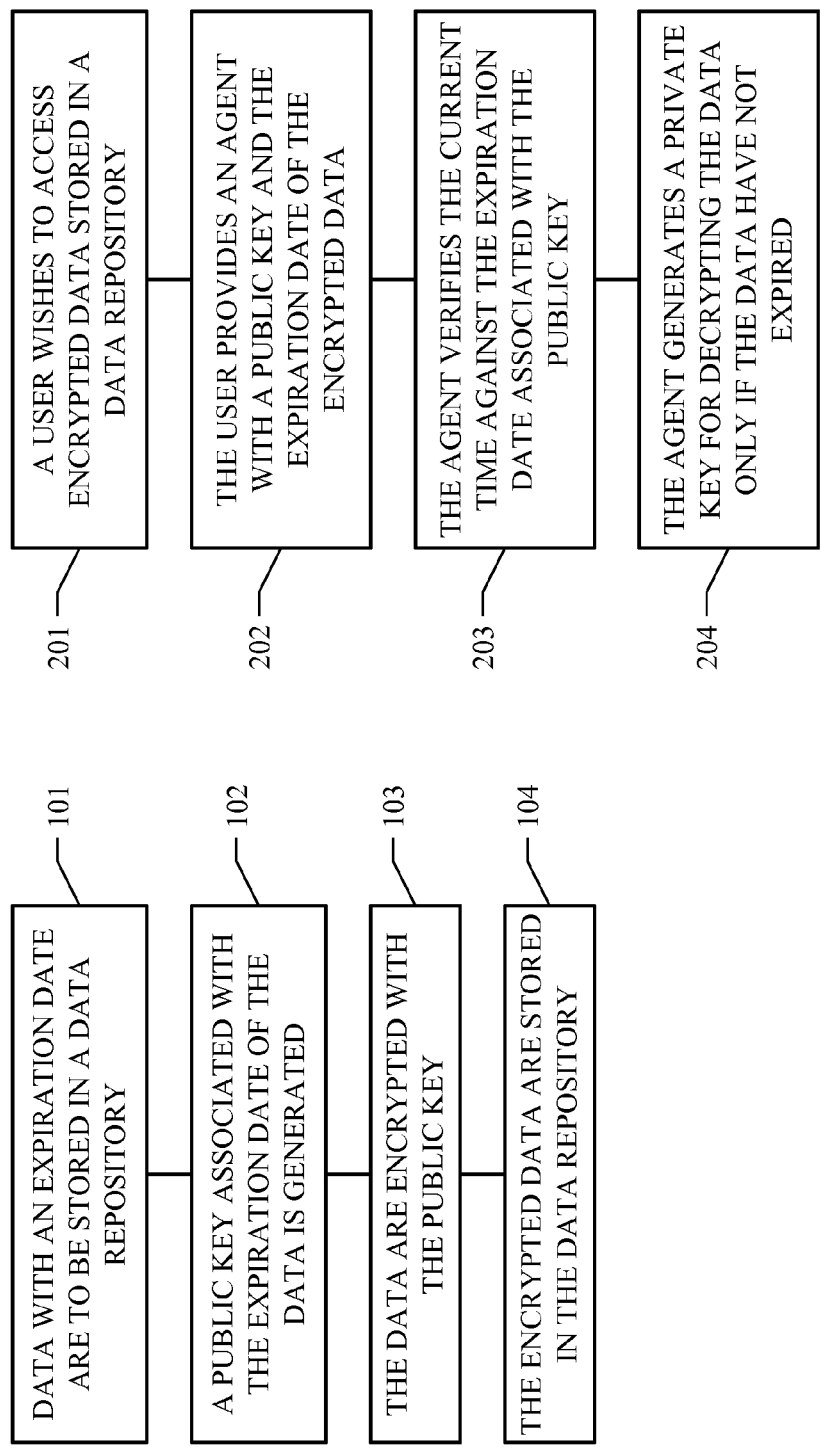

US 8,948,381 B2

CONDITIONAL KEY GENERATION BASED ON EXPIRATION DATE OF DATA

TECHNICAL FIELD

This disclosure generally relates to data security and more specifically relates to preventing access to encrypted data after the data have expired.

BACKGROUND

Cloud storage is a model of networked online storage where data are stored on multiple virtual servers, usually hosted by third parties (e.g., parties who are not owners of the stored data), rather than being hosted on dedicated servers. These third-party hosting companies operate large data centers, and in the background, virtualize the resources according to the requirements of their customers (e.g., the owners of the stored data) and expose the resources as storage pools, which the customers can themselves use to store files or data objects. Physically, the resources may span across multiple servers.

As a part of data security, the data stored in a cloud storage, especially in a public cloud storage, are sometimes encrypted. A correct key is required to decrypt the encrypted data before the data can be accessed by anyone. In addition, the data are often duplicated into multiple copies and distributedly stored on multiple servers so that if one copy of the data is unavailable due to any reason (e.g., device failure), there is at least another copy of the same data that can be accessed.

BRIEF DESCRIPTION OF THE DRAWINGS

FIG. 1 illustrates an example method for encrypting data for storage.

FIG. 2 illustrates an example method for decrypting stored data.

DESCRIPTION OF EXAMPLE EMBODIMENTS

Figure 4:
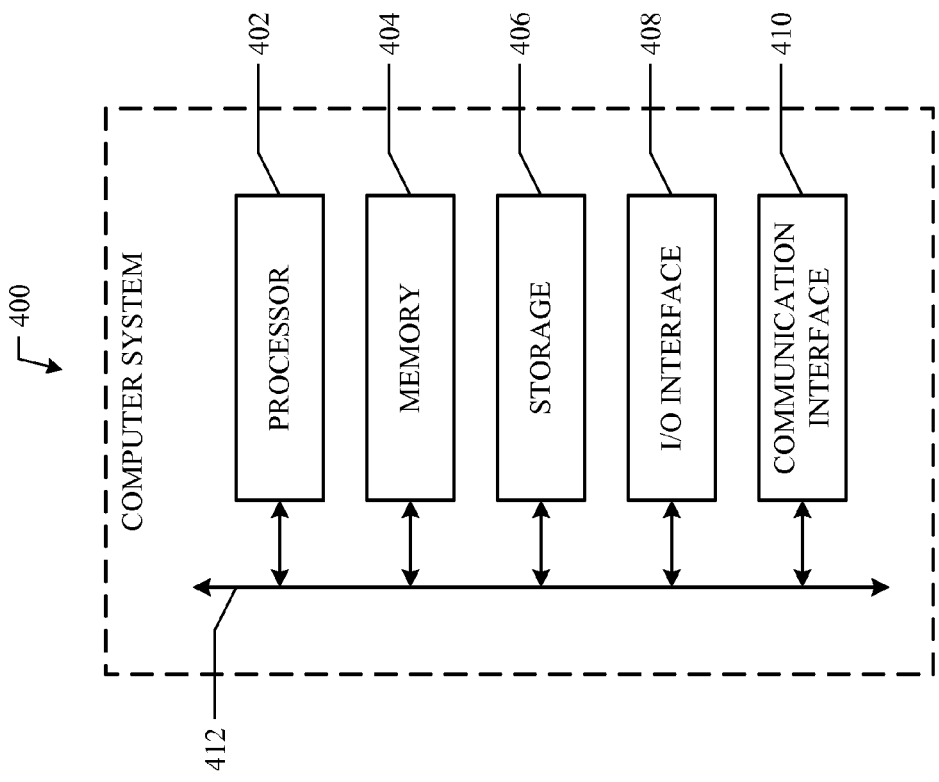
FIG. 4 illustrates an example computer system.

There are various types of data repositories, sometimes referred to as data stores. On a smaller scale, data may be stored on a single computing device (e.g., a server) or a few networked computing devices. On a larger scale, data may be stored in data centers or cloud storages, which may span across a great number of computing devices. Regardless of the specific types of data repositories involved, for data security and protection, the stored data may be encrypted to prevent unauthorized access and duplicated to guard against data loss or corruption and device failure.

In some cases, sensitive or important data may be stored in a data repository, such as a cloud storage or data center. To guard against accidental data loss or corruption, the data may be duplicated into multiple copies and stored distributedly on multiple computing devices. These computing devices may even be physically located in different locations. Consequently, if one copy of the data is lost or corrupted or otherwise unavailable, there is at least another copy of the same data that can be accessed. Such data backup scheme is widely used in connection with most types of data repositories, large or small.

Sometimes, certain types of data must be stored and maintained for a specific period of time. For example, Section 802 of the Sarbanes-Oxley Act requires auditors to retain auditing information for a period of seven years. The Health Insurance Portability and Accountability Act requires that relevant records must be maintained for six years. Only after the required time period has passed may the data be destroyed (e.g., for security reason).

When there are multiple copies of data distributedly stored in different locations, completely destroying the data may be difficult. To ensure that all copies of the data are destroyed, either each and every copy of the data has to be individually tracked over time or an exhaustively search for all copies of the data has to be performed throughout the entire data repository at the time of data destruction. Both solutions increase operational overhead for data-repository operators while at the same time, do not necessarily guarantee that each and every existing copy of the data can be located and definitely destroyed.

In particular embodiments, when a set of data is to be stored in a data repository (e.g., in a data center or a cloud storage) and the set of data has an expiration date, a public key is generated for encrypting the set of data. The expiration date of the data is associated with the public key. The set of data is encrypted with the public key before being stored in the data repository. Subsequently, copies of the encrypted data may be made and stored (e.g., for backup or data protection). If any copy of this set of data is accessed by any user, the user needs to obtain a corresponding private key from an agent for decrypting the data. The agent verifies whether the expiration date of the data associated with the public key has passed. Only when the expiration date of the data has not yet passed does the agent generate a private key for the user. Otherwise, if the expiration date of the data has already passed, the agent does not provide any private key to any user. Therefore, after the expiration date of the data has passed, no user can obtain a private key from the agent to decrypt any copy of the encrypted data. Consequently, all copies of the encrypted data are inaccessible to all users.

Figure 3:
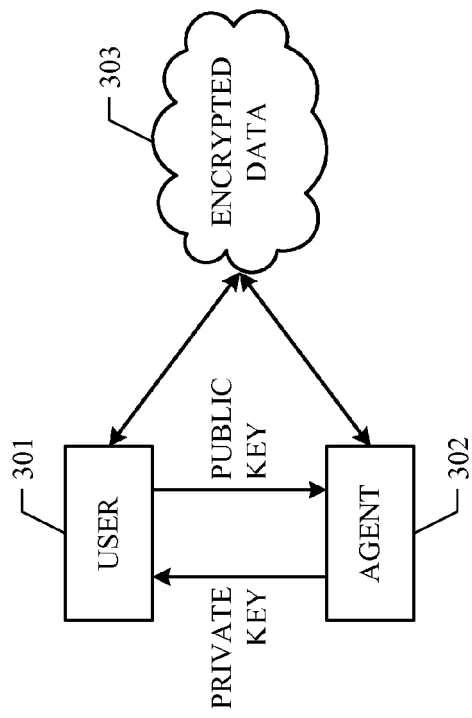
FIG. 3 illustrates an example system for encrypting and decrypting data.

Given a set of data, in particular embodiments, there may be three relevant entities, as illustrated in FIG. 3. First, there is a user 301 who owns or is associated with the data. Second, there is an agent 302 that is responsible for controlling access to the data. Third, there is a data repository 303 in which the data are stored. Note that the divisions of these three entities is purely conceptual. For example, in some implementations, agent 302 may be a part of data repository 303 (e.g., as one of the modules of data repository 303). In other implementations, agent 302 may function relatively independently. In yet other implementations, agent 302 may be associated with user 301 (e.g., maintained by user 301). As another example, in some implementations, user 301 may operate data repository 303. In other implementations, data repository 303 may be operated by a third party.

In particular embodiments, agent 302 may be implemented as computer hardware or software or a combination thereof executing on any number of computing devices (e.g., servers). Data repository 303 may be a single computing device, any number of networked computing devices, a data center, a cloud storage, or a combination of different types of data repositories. This disclosure contemplates any applicable type of data repository 303.

FIG. 1 illustrates an example method for encrypting data for storage. In particular embodiments, suppose that a set of data having an expiration date is to be stored in a data repository (STEP 101), such as data repository 303. This set of data is owned by or associated with a user, such as user 301. The expiration date of the data may be specified by the user.

A public key is generated for encrypting the data, and the public key is associated with the expiration date of the data (STEP 102). This public key is valid only when it is still within the expiration date of the data. In some implementations, the public key may be generated by the user. In other implementations, the public key may be generated by an agent, such as agent 302.

There are different methods to associate an expiration date with an encryption key, and this disclosure contemplates any applicable method. For example, in some implementations, the expiration date of the data may be a part of the public key (e.g., included in the public key). In other implementations, Attribute-Based Encryption is utilized where ($t \leq t_{exp}$) is an attribute. In this case, "t" represents the current time, and "$t_{exp}$" represents the expiration date of the data. Attribute-Based Encryption is designed so that if the attribute is not satisfied, the key is invalid. In yet other implementations, a certificate is generated for the public key, and the certificate marks the expiration date of the data. This certificate is checked to determine whether the public key is valid.

The set of data is encrypted using the public key (STEP 103) either by the agent or by the user, and the encrypted data are stored in the data repository (STEP 104). In particular embodiments, the public key may be managed by the user or the agent for subsequent access of the encrypted data. While the set of data, now encrypted, is stored in the data repository, copies of the data may or may not be made. If any copy of the data is made, the copied data are also in the encrypted form.

FIG. 2 illustrates an example method for decrypting stored data. In particular embodiments, suppose that a set of data, which has been encrypted with a public key, is stored in a data repository, such as data repository 303, and a user, such as user 301, wishes to access the encrypted data (STEP 201). This set of data has an expiration date, which is associated with the public key used to encrypt the data. The user provides the public key and the associated expiration date to an agent, such as agent 302 (STEP 202).

The agent validates the public key by comparing the current time (i.e., the time when the user wishes to access the encrypted data) against the expiration date associated with the public key (STEP 203). In some implementations where the expiration date is included in the public key, the agent may extract the expiration date from the public key and compare it with the current time. If the current time is beyond the expiration date, then the public key is invalid. If the current time is within the expiration date, then the public key is valid. In other implementations where Attribute-Based Encryption, the agent may verify the attribute ($t \leq t_{exp}$) with "t" set to the current time. The public key is valid only when the attribute is satisfied (i.e., the current time is less than or equal to the expiration date). In yet other implementations where a certificate marking the expiration date is associated with the public key, the agent make check the certificate against the current time.

The public key is valid only when the expiration time associated with the public key has not passed (i.e., the current time is within the expiration time). If the expiration time associated with the public key has not passed, the agent generates a private key for decrypting the data using the public key (STEP 204). In some implementations, the agent provides this private key to the user. In this case, the user may decrypt the encrypted data stored in the data repository using the private key. In other implementations, the agent decrypts the encrypted data stored in the data repository itself and sends the decrypted data to the user.

On the other hand, if the expiration time associated with the public key has already passed, the public key becomes invalid and the agent does not generate any private key for the user. Without a proper private key, neither the agent nor the user can successfully decrypt the data stored in the data repository. As a result, all copies of the encrypted data stored in the data repository become inaccessible to any user.

In particular embodiments, when any user wishes to access any copy of a set of data stored in a data repository, and the data have an expiration date, which is associated with a public key used to encrypt the data, the user provides the public key and the associated expiration date to an agent that is responsible for controlling access to the data stored in the data repository. The agent validates the public key by comparing the associated expiration date against the current time when the user wishes to access the data. Only when the expiration date has not passed (i.e., the data have not expired and the public key is still valid) does the agent generate a private key for decrypting the data using the public key.

There are many encryption/decryption algorithms using public-and-private key pairs to encrypt and decrypt data respectively, where the keys are associated with time, and this disclosure contemplates any applicable encryption/decryption algorithm for encrypting and decrypting the data stored in a data repository. For example, in some implementations, an Identity-Based Encryption scheme, called Fuzzy Identity-Based Encryption may be used. With Fuzzy Identity-Based Encryption, an identity is viewed as a set of descriptive attributes. In this case, ($t \leq t_{exp}$) may be one of the attributes and an arbitrary string may server as a public key. In other implementations, a forward-secure encryption scheme may be used. This scheme protects the secret keys by evolving the keys time.

Particular embodiments may be implemented on one or more computer systems. FIG. 4 illustrates an example computer system 400. An agent (e.g., agent 302), implemented as computer software, may reside and execute on computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 400 may include one or more computer systems 400; be unitary or distributed; span multiple locations; span multiple machines; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include an HDD, a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 402 (such as, for example, one or more internal registers or caches), one or more portions of memory 404, one or more portions of storage 406, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA, C, or C++. In particular embodiments, software is expressed in Hyper Text Markup Language (HTML), Extensible Markup Language (XML), or other suitable markup language.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method performed by one or more computing devices, the method comprising: by the one or more computing devices,
   receiving a first request in connection with storing a set of data for at least a first period of time, the first request including a user-specified expiration date for the set of data, the user-specified expiration date for the set of data based on predefined rule or policy specifying how long the set of data must be stored;

generating a first key associated with the user-specified expiration date for the set of data for encrypting the set of data;

receiving a second request in connection with accessing the set of data after the set of data has been encrypted using the first key wherein the second request comprises the first key and in response:

determining that the user-specified expiration date for the set of data based on the predefined rule or policy specifying how long the set of data must be stored has not passed by comparing the user-specified expiration date for the set of data against a first current time; and generating a second key for decrypting the set of data using the second key only if the user-specified expiration date for the set of data has not passed; and receiving a third request in connection with accessing the set of data after the set of data has been encrypted using the first key but after the user-specified expiration date for the set of data has passed, wherein the third request comprises the first key and in response:

determining that the user-specified expiration date for the set of data based on the predefined rule or policy specifying how long the set of data must be stored has passed by comparing the user-specified expiration date for the set of data against a second current time; and refusing to generate a third key for decrypting the set of data in response to determining that the second current time is subsequent to the user-specified expiration data for the set of data that is based on the predefined rule or policy specifying how long the set of data must be stored.

2. The method of claim 1, wherein the set of data is stored in a cloud storage.

3. The method of claim 1, wherein:
the expiration date is a part of the first key; and
validating the first key comprises:
 extracting the expiration date from the first key; and
 comparing the expiration date against the current time.

4. The method of claim 1, wherein:
the set of data has been encrypted using Attribute-Based Encryption;
($t \le t_{exp}$), where "t" representing current time and "$t_{exp}$" representing the expiration date, is an attribute of Attribute-Based Encryption; and
validating the first key comprises determining whether the attribute is satisfied.

5. The method of claim 1, wherein:
a certificate marking the expiration date is associated with the first key; and
validating the first key comprises verifying the certificate.

6. The method of claim 1, further comprising sending the second key in response to the second request.

7. The method of claim 1, further comprising:
decrypting the set of data using the second key to obtain a set of decrypted data; and
sending the set of decrypted data in response to the second request.

8. A system comprising:
a memory comprising instruction executable by one or more processors; and
the one or more processors coupled to the memory and configured to execute the instructions, the one more processors being configured when executing the instructions to:
receive a first request in connection with storing a set of data for at least a first period of time, the first request including a user-specified expiration data for the set of data, the user-specified expiration date for the set of data based on predefined rule or policy specifying how long the set of data must be stored;

generate a first key associated with the user-specified expiration date for the set of data for encrypting the set of data;

receive a second request in connection with accessing the set of data after the set of data has been encrypted using the first key, wherein the second request comprises the first key, and in response:

determine that the user-specified expiration date for the set of data based on the predefined rule or policy specifying how long the set of data must be stored has not passed by comparing the user-specified expiration date for the set of data against a first current time; and generate a second key for decrypting the set of data using the second key only if the user-specified expiration date for the set of data has not passed; and receive a third request in connection with accessing the set of data after the set of data has been encrypted using the first key but after the user-specified expiration date for the set of data has passed, wherein the third request comprises the first key, and in response:

determine that the user-specified expiration date for the set of data based on the predefined rule or policy specifying how long the set of data must be stored has passed by comparing the user-specified expiration date for the set of data against a second current time; and refuse to generate a third key for decrypting the set of data in response to determining that the second current time is subsequent to the user-specified expiration date for the set of data that is based on the predefined rule or policy specifying how long the set of data must be stored.

9. The system of claim 8, wherein the set of data is stored in a cloud storage.

10. The system of claim 8, wherein:
the expiration date is a part of the first key; and
validate the first key comprises:
 extract the expiration date from the first key; and
 compare the expiration date against the current time.

11. The system of claim 8, wherein:
the set of encrypted-data has been encrypted using Attribute-Based Encryption;
($t < t_{exp}$), where "t" representing current time and "$t_{exp}$" representing the expiration date, is an attribute of Attribute-Based Encryption; and
validate the first key comprises determine whether the attribute is satisfied.

12. The system of claim 8, wherein:
a certificate marking the expiration date is associated with the first key; and
validate the first key comprises verify the certificate.

13. The system of claim 8, wherein the one or more processors are further operable when executing the instructions to send the second key in response to the second request.

14. The system of claim 8, wherein the one or more processors are further operable when executing the instructions to:
decrypt the set of using the second key to obtain a set of decrypted data; and
send the set of decrypted data in response to the first request.

15. One or more computer-readable non-transitory storage media embodying software configured when executed by one or more computer systems to:
receive a first request in connection with storing a set of data for at least a first period of time, the first request including a user-specified expiration date for the set of data, the user-specified expiration date for the set of data based on predefined rule or policy specifying how long the set of data must be stored;

generate a first key associated with the user-specified expiration date for the set of data for encrypting the set of data;

receive a second request in connection with accessing the set of data after the set of data has been encrypted using the first key, wherein the second request comprises the first key, and in response:

determine that the user-specified expiration date for the set of data based on the predefined rule or policy specifying how long the set of data must be stored has not passed by comparing the user-specified expiration date for the set of data against a first current time; and generate a second key for decrypting the set of data using the second key only if the user-specified expiration date for the set of data has not passed; and receive a third request in connection with accessing the set of data after the set of data has been encrypted using the first key but after the user-specified expiration date for the set of data has passed, wherein the third request comprises the first key, and in response:

determine that the user-specified expiration date for the set of data based on the predefined rule or policy specifying how long the set of data must be stored has passed by comparing the user-specified expiration date for the set of data against a second current time; and refuse to generate a third key for decrypting the set of data in response to determining that the second current time is subsequent to the user-specified expiration date for the set of data that is based on applicable law or regulation specifying how long the set of data must be stored.

16. The media of claim 15, wherein the set of data is stored in a cloud storage.

17. The media of claim 15, wherein:
the expiration date is a part of the first key; and
validate the first key comprises:
extract the expiration date from the first key; and
compare the expiration date against the current time.

18. The media of claim 15, wherein:
the set of encrypted-data has been encrypted using Attribute-Based Encryption;
($t<t_{exp}$), where "t" representing current time and "$t_{exp}$" representing the expiration date, is an attribute of Attribute-Based Encryption; and
validate the first key comprises determine whether the attribute is satisfied.

19. The media of claim 15, wherein:
a certificate marking the expiration date is associated with the first key; and
validate the first key comprises verify the certificate.

20. The media of claim 15, wherein the software is further operable when executed by the one or more computer systems to send the second key in response to the first-second request.

21. The media of claim 15, wherein the software is further operable when executed by the one or more computer systems to:
decrypt the set of encrypted data using the second key to obtain a set of decrypted data; and
send the set of decrypted data in response to the second request.

22. A system comprising:
a hardware processor; and
a memory for storing executable instructions that, when executed by the hardware processor, cause the hardware processor to perform steps of:
generating a first key associated with a user-specified expiration date for a set of data for encrypting the set of data, the user-specified expiration date for the set of data based on predefined rule or policy specifying how long the set of data must be stored;
receiving, a first request in connection with storing a set of data for at least a first period of time, the first request including the user-specified expiration date for the set of data;
receiving, a second request in connection with accessing the set of data after the set of data has been encrypted using the first key, wherein the second request comprises the first key; and
receiving, a third request in connection with accessing the set of data after the set of data has been encrypted using the first key but after the user-specified expiration date for the set of data has passed, wherein the third request comprises the first key;
determining, that the user-specified expiration date for the set of data based on applicable law or regulation the predefined rule or policy specifying how long the set of data must be stored has not passed by comparing the user-specified expiration date for the set of data against a first current time; and
determining, that the user-specified expiration date for the set of data based on the predefined rule or policy specifying how long the set of data must be stored has passed by comparing the user-specified expiration date for the set of data against a second current time;
generating a second key for decrypting the set of data using the second key only if the user-specified expiration date for the set of data has not passed; and
refusing to generate a third key for decrypting the set of data in response to determining that the second current time is subsequent to the user-specified expiration date for the set of data that is based on the predefined rule or policy specifying how long the set of data must be stored.

* * * * *

UNITED STATES PATENT AND TRADEMARK OFFICE
CERTIFICATE OF CORRECTION

PATENT NO. : 8,948,381 B2  
APPLICATION NO. : 13/228786  
DATED : February 3, 2015  
INVENTOR(S) : Zhexuan Song Page 1 of 1

It is certified that error appears in the above-identified patent and that said Letters Patent is hereby corrected as shown below:

In the claims:

Col. 9, Ln. 67: After "user-specified expiration" and before "for the set" delete "data" and insert -- date --.

Col. 10, Ln. 42: After "the set of" and before "has been encrypted" delete "encrypted-data" and insert -- data --.

Col. 10, Ln. 44: Before "where 't' representing..." delete "$(t < t_{exp})$," and insert -- $(t \leq t_{exp})$, --.

Col. 10, Ln. 59: After "decrypt the set of" and before "using the second key" insert -- data --.

Col. 11, Ln. 44: After "the set of" and before "has been encrypted" delete "encrypted-data" and insert -- data --.

Col. 11, Ln. 46: Before "where 't' representing..." delete "$(t < t_{exp})$," and insert -- $(t \leq t_{exp})$, --.

Col. 12, Ln. 3: After "in response to the" and before "request" delete "first-second" and insert -- second --.

Col. 12, Ln. 34: After "the set of data based on" delete "applicable law or regulation".

Signed and Sealed this  
Twenty-eighth Day of April, 2015

Michelle K. Lee  
*Director of the United States Patent and Trademark Office*